No. 801,015. PATENTED OCT. 3, 1905.
C. J. JOHNSON.
FLUE CUTTER.
APPLICATION FILED DEC. 20, 1904.
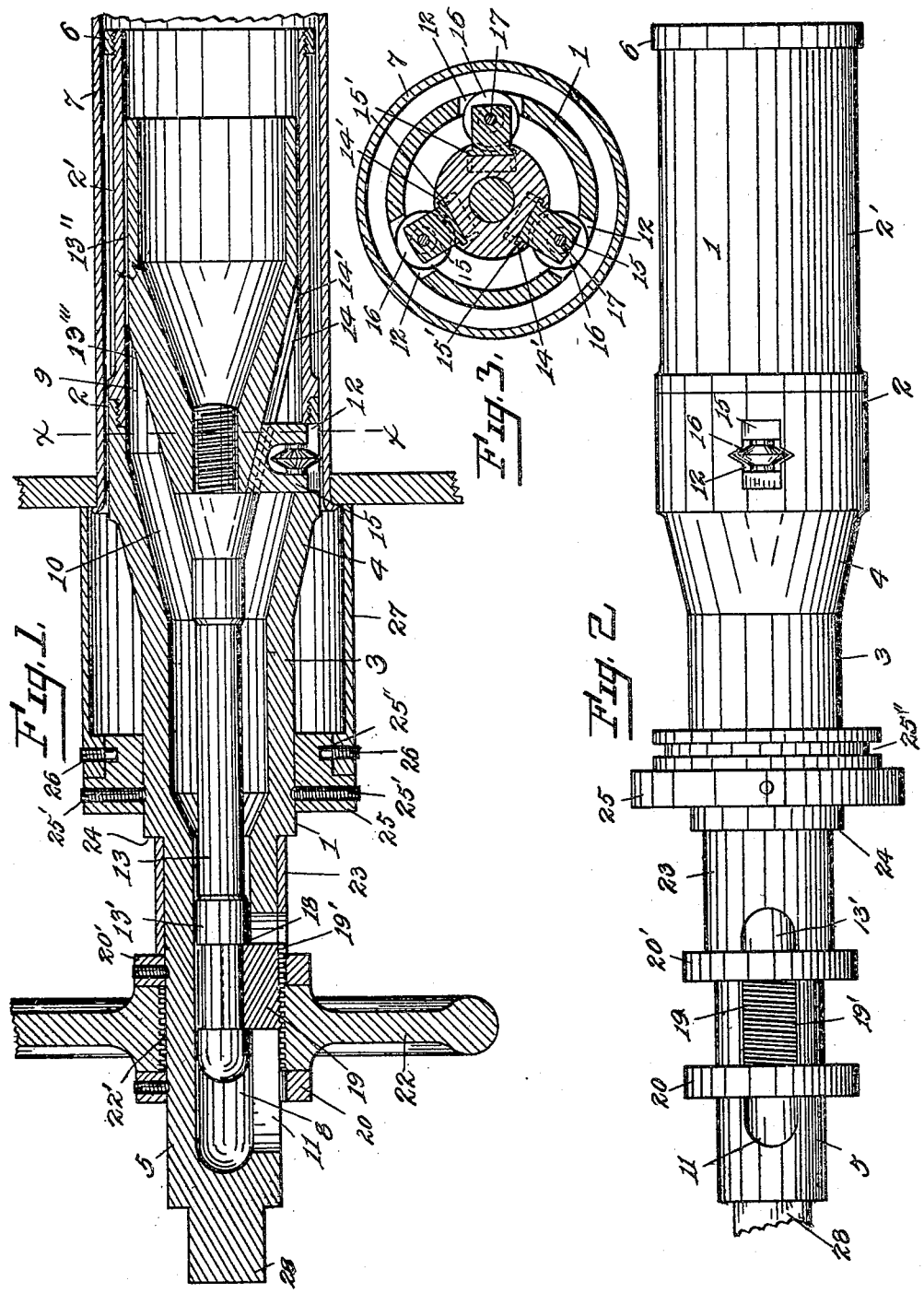
WITNESSES:
Paul Barnes.
F. Dudley Moss.
INVENTOR.
Charles J. Johnson
BY Pierre Barnes
ATTORNEY.

UNITED STATES PATENT OFFICE.

CHARLES JOHN JOHNSON, OF SEATTLE, WASHINGTON.

FLUE-CUTTER.

No. 801,015.　　　Specification of Letters Patent.　　　Patented Oct. 3, 1905.

Application filed December 20, 1904. Serial No. 237,606.

*To all whom it may concern:*

Be it known that I, CHARLES JOHN JOHNSON, a citizen of the United States, residing at Seattle, in the county of King and State of Washington, have invented certain new and useful Improvements in Flue-Cutters, of which the following is a specification, reference being had therein to the accompanying drawings.

This invention relates to tools employed for cutting off tubes or flues; and it consists in the novel structure and adaptation of parts, as hereinafter described, whereby is produced a cutter of this description which is of inexpensive and durable construction and one which is capable of being actuated to cut off a tube or flue with despatch and at any desired point.

In the drawings, which illustrate an embodiment of my invention, Figure 1 is a longitudinal section of the device, shown inserted part way within a boiler-tube. Fig. 2 is a plan view of the same with the hand adjusting-wheel removed, and Fig. 3 is a cross-section taken on the broken line $x\ x$ of Fig. 1.

The improved tube-cutter comprises a casing or stock 1, provided with cylindrical portions 2 and 3 of different diameters, an intermediate tapering portion 4, and a shank 5 of less diameter, preferably, than the part 3. For convenience in manufacture and assembling the portion 2 of the casing is made of two parts, which may advantageously be joined by screwing a reduced end of the outer of these parts 2' into a socket formed in the outer end of the inner part. A guide-bushing 6 of somewhat less diameter than that of the inside of the tube 7 to be cut is removably secured, as by screwing, upon the outer extremity of the part 2'.

Chambers 8, 9, and 10 are provided axially of the casing and communicating with each other, of which the first-named two are bored or formed cylindrical and the other one to a conical shape, as shown. Extending through the shank 5 is a longitudinal slot 11, and apertures 12 are provided in the perimeter of the casing and in proximity of the larger end of the chamber 10.

A mandrel 13 is positioned within the casing and has its ends 13' and 13'' formed to make sliding fits with the chambers 8 and 9, respectively, and is formed, intermediately of its ends 13' 13'', with a conical portion 13''' of corresponding taper, preferably, with the wall of the chamber 10.

Longitudinal slots 14 extend the entire length of the conical part of the mandrel and are disposed in the same radial planes, respectively, with the said apertures of the casing. Seated in each of these slots and protruding outwardly into the respective said apertures are registering-blocks 15, provided with transverse wings 15', which fit into corresponding guideways 14', provided in the side walls of the slots 14, whereby the said blocks are caused by longitudinal movements of the mandrel to be thrust radially in or out within their apertures. A cutter-wheel is rotatably mounted between the bifurcated outer ends of each said block by means of axles 17. The portion 13' of the mandrel is recessed, by a circumferential groove 18 preferably, immediately below the casing-slot 11 and in which is seated a block 19, having a corresponding contacting surface and extending the entire length of the recess. The outer surface of this block projects outside of the casing-shank and is provided thereat with threads 19', comprising the segment of a screw. Rotatably seated upon the shank between two set-collars 20 20' is a hand-wheel 22, having its hub-bore 22' screw-threaded to register with the segmental screw of the block 19, and in consequence a rotary movement of the wheel imparts, through the engaged block, a longitudinal movement to the mandrel to cause the inward or outward movement of the blocks carrying the cutter-wheels. A sleeve 23 is desirably interposed between a shoulder 24, provided upon the casing, and the adjacent collar 20', for the purpose of preventing the displacement of the latter even when under a considerable strain.

25 is a collar adjustably secured, as by set-screws 25', to the cylindrical part 3 of the casing and is provided with an annular groove 25'' for the reception of the studs 26 of a cylindrical guide-piece 27, and by adjusting the latter through the changes in the position of the collar 25 relatively of the length of the casing the positions of the cutter-wheels may be regulated from the outer surface of the boiler-tube sheet, as shown in the example, or where the tube is not so sustained by causing the adjusted collar 25 to bear directly against the end of the tube.

The cutter-wheels are coincidently moved into or out of operative position by manipulating the hand-wheel aforesaid, and with the cutter-wheels in operative position the entire tool is rotated to carry the cut around the tube by manual or power-actuated devices connected to the extremity 28 of the casing-shank.

It will be seen from the foregoing that the implement is extremely simple both in construction and in operation and is perfectly adapted for the purposes for which intended.

Having described my invention, what I claim as new, and desire to secure by Letters Patent, is—

In a tube or flue cutter, the combination of a hollow casing having a conical portion and a removable cylindrical end, a collar carried by the casing and adjustable longitudinally thereon, said collar being provided with an annular groove, a cylindrical guide-piece carried by said collar, studs screwing into said guide-piece and fitting in the annular groove in the collar a mandrel having a cylindrical end fitting in the cylindrical end of the casing, said mandrel having a conical portion provided with a plurality of longitudinally-disposed grooves, a block slidably fitted in each of said grooves, each block protruding into an aperture provided in the casing, a rotary cutter-wheel mounted in each said block, a block carried by the mandrel and provided with partial threads and a wheel mounted on the casing and having a screw-thread in its hub engaging said last-named block.

In testimony whereof I affix my signature in presence of two witnesses.

CHARLES JOHN JOHNSON.

Witnesses:
PIERRE BARNES,
PAUL BARNES.